(12) United States Patent
Li (10) Patent No.: US 10,086,953 B1
(45) Date of Patent: Oct. 2, 2018

(54) AIRCRAFT BEACON LIGHT SYNCHRONIZATION

(71) Applicant: HONEYWELL INTERNATIONAL INC., Morris Plains, NJ (US)

(72) Inventor: Qixiang Li, Beijing (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/463,569

(22) Filed: Mar. 20, 2017

(51) Int. Cl.
*H05B 37/02* (2006.01)
*B64D 47/06* (2006.01)
*H05B 33/08* (2006.01)

(52) U.S. Cl.
CPC ......... *B64D 47/06* (2013.01); *H05B 33/0803* (2013.01); *H05B 33/086* (2013.01); *H05B 33/0818* (2013.01); *H05B 33/0845* (2013.01)

(58) Field of Classification Search
CPC ............ H05B 33/0803; H05B 33/0818; H05B 33/0845; H05B 37/036
USPC .......................... 315/200 A, 241 S, 291, 360
See application file for complete search history.

(56) References Cited

U.S. PATENT DOCUMENTS

| | | | | |
|---|---|---|---|---|
| 3,620,626 A | * | 11/1971 | Richard | G01S 17/105 340/961 |
| 2002/0101189 A1 | * | 8/2002 | Vo | B64D 47/06 315/241 S |
| 2008/0001061 A1 | | 1/2008 | Glassner et al. | |
| 2009/0261651 A1 | * | 10/2009 | Godecke | H04B 3/54 307/3 |
| 2011/0001626 A1 | * | 1/2011 | Yip | H05B 37/0263 340/635 |
| 2013/0201316 A1 | | 8/2013 | Binder et al. | |
| 2014/0185280 A1 | * | 7/2014 | Peck | F21V 5/00 362/231 |
| 2017/0245331 A1 | * | 8/2017 | Barker | H05B 33/0803 |

FOREIGN PATENT DOCUMENTS

GB 2522853 A 8/2015
KR 1302521 B1 9/2013

* cited by examiner

*Primary Examiner* — Tung X Le (74) *Attorney, Agent, or Firm* — Lorenz & Kopf, LLP (57) ABSTRACT

A synchronized, aircraft light system includes a first light emitting diode (LED) light source disposed on the aircraft and a second LED light source disposed on the aircraft. The first LED light source and the second LED light source are operatively coupled to a direct current (DC) power source by a DC power bus. A power line communication (PLC) modem is operatively coupled to the DC power bus. The PLC modem is operable to impart a synchronization signal on the DC power bus, such that the first LED light source and the second LED light source are caused to illuminate via power supplied from the DC power source via the DC power bus, in a predetermined, synchronous manner with respect to each other.

20 Claims, 6 Drawing Sheets

AIRCRAFT BEACON LIGHT SYNCHRONIZATION

TECHNICAL FIELD

This patent generally relates to aircraft lighting, and in particular, this patent relates to light emitting diode (LED)-based aircraft external lights and synchronization of the same on an aircraft.

BACKGROUND

Aircraft are fitted with a variety of external lights such as position lights, landing lights and anti-collision strobes and beacons. Aircraft position lights (APLs), also known as navigation lights, by color and placement on the aircraft identify its position, heading and status. Beacon lights, sometimes referred to as anti-collision or strobe lights, provide synchronized, high-intensity bursts of light to help other pilots recognize the aircraft's position in low-visibility conditions. Legacy beacon/anti-collision light system consist of two synchronized red flashing incandescent lamps installed on the top and the bottom of the fuselage, and three synchronized white flashing incandescent lamps which are installed on each wing tip and the tail of the fuselage. Similarly, legacy APLs consist of red and green incandescent lamps installed on the left and right wing tips, respectively, which remain continuously illuminated during aircraft operation.

Light emitting diodes (LEDs) offer superior operational life as compared to incandescent lamps, and in certain configurations superior light output. As such, LEDs are being used with increased frequency in aircraft lighting applications in place of incandescent lamps including beacon/anti-collision applications. However, because LEDs require direct current (DC) power, their operation cannot be synchronized using the alternating current (AC) frequency of the power line as a synchronizing trigger. Instead, LED anti-collision light systems use a network of cables within the air-frame in addition to power cables to provide synchronization signals to the LEDs. These cables commonly weigh tens to hundreds of pounds and directly impact aircraft operational payload and fuel consumption.

Therefore, it is desirable to provide an LED-based beacon/anti-collision light system that does not require synchronizing cables, thus reducing aircraft weight.

SUMMARY

In a non-limiting, exemplary embodiment, a synchronized, aircraft light system includes a first light emitting diode (LED) light source disposed on the aircraft and a second LED light source disposed on the aircraft. The first LED light source and the second LED light source are operatively coupled to a direct current (DC) power source by a DC power bus. A power line communication (PLC) modem is operatively coupled to the DC power bus. The PLC modem is operable to impart a synchronization signal on the DC power bus, such that the first LED light source and the second LED light source are caused to illuminate via power supplied from the DC power source via the DC power bus, in a predetermined, synchronous manner with respect to each other.

In an alternate, non-limiting, exemplary embodiment, an aircraft is fitted with at least a first LED light source and a second LED light source. The first LED light source and the second LED light source are operatively coupled to a direct current (DC) power source by a DC power bus. A power line communication (PLC) modem is operatively coupled to the DC power bus. The PLC modem is operable to impart a synchronization signal on the DC power bus, such that the first LED light source and the second LED light source are caused to illuminate via power supplied from the DC power source via the DC power bus, in a predetermined, synchronous manner with respect to each other.

Yet another non-limiting embodiment provides an aircraft light status indicating system. The aircraft light system includes a first LED light source disposed on the aircraft and a second LED light source disposed on the aircraft. The first LED light source and the second LED light source are operatively coupled to a DC power source by DC power bus. A PLC modem is operatively coupled to the DC power bus. The PLC modem is operable to impart a synchronization signal on the DC power bus, such that the first LED light source and the second LED light source are caused to illuminate via power supplied from the DC power source via the DC power bus in a predetermined, synchronous manner with respect to each other. A status monitor is provided that is operably coupled to each of the first LED light source and the second LED light source and to associated LED operating circuits. The status monitor provides a status signal which is communicated via the PLC modem to a cockpit indicator and/or to a ground control device indicating the current operational status of the LED light source and the associate LED operating circuit.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Embodiments of the subject matter described herein provide light emitting diode (LED)-based external light systems for aircraft, such as without limitation, anti-collision and beacon light systems. Additionally, provided is an LED element health management system capable of providing a flight crew with a direct indication of the status of one or more LED light sources and associated circuitry.

Figure 1:
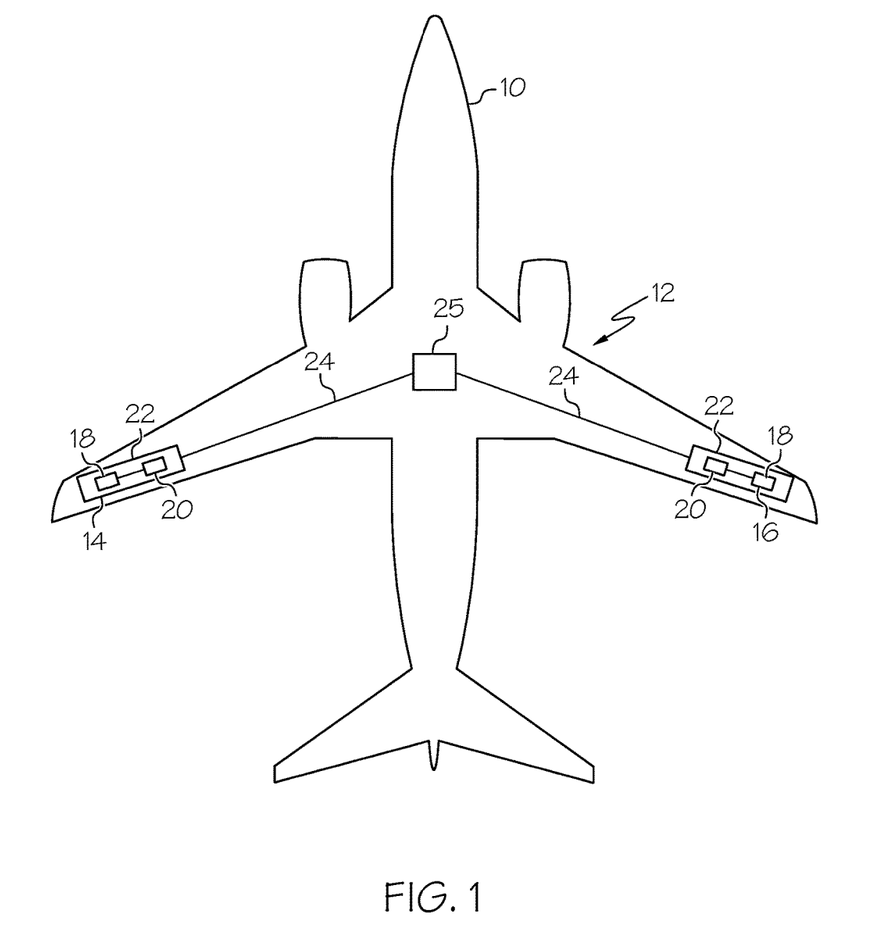
FIG. 1 is a graphic depiction of an aircraft including a synchronized light emitting diode (LED)-based light system in accordance with herein described embodiments.

Referring to FIG. 1 an aircraft 10 includes an aircraft LED-based synchronized light system 12 with a first light 14 and second light 16. The first light 14 and the second light 16 are intended to operate in a synchronized manner. That is, lights 14 and 16 may operate in a predetermined scheme of illumination, e.g., illuminating simultaneously, illuminating separately in a predetermined pattern, and/or combinations thereof given an operating condition of the aircraft 10 and the intended purpose of the lights 14 and 16, e.g., position lights, beacons and/or anti-collision strobes. While the system 12 is described as including two lights, lights 14 and 16, it will be understood that additional position lights, strobes, beacons and the like, that may require synchronized operation may be added to the system 12 without departing from the exemplary embodiment herein described.

Figure 2:
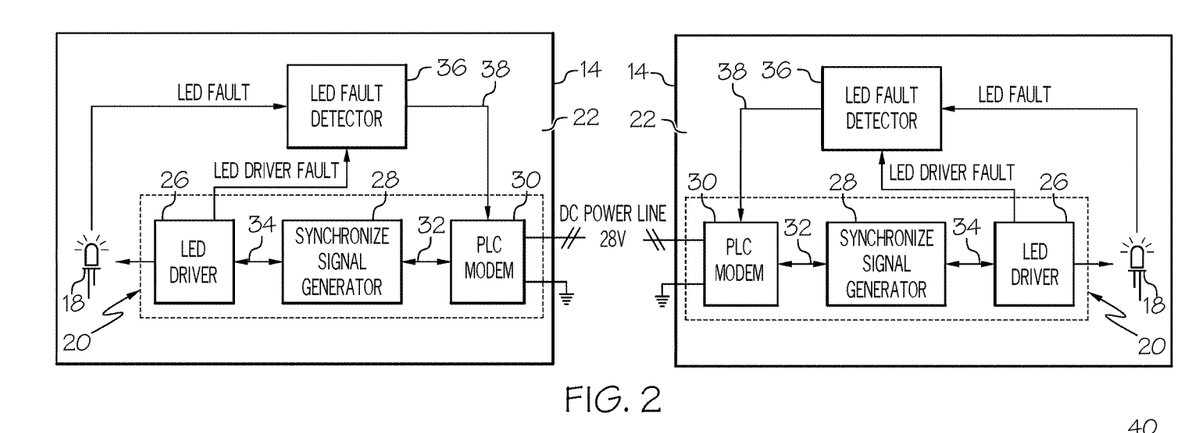
FIG. 2 is a block diagram of a synchronized LED-based light system in accordance with a herein described exemplary embodiment.

With continued reference to FIG. 1 and reference to FIG. 2, each light 14 and 16 may include an LED light source 18 and an associated operating circuit 20. The operating circuit 20 and LED light source 18 form an integrated module 22. It will be understood the LED light source 18 and associated operating circuit 20 may be provided as separate components, portions of the operating circuit 20 may be provided within the integrated module 22 while other portions of the operating circuit 20 are separately provided and operably coupled to the LED light source 18 and/or module 22. Therefore, the person having ordinary skill in the art will appreciate that the various elements of the system 12 may be provided as assemblies, modules, components and combinations thereof without departing from the exemplary embodiments. The operating circuits 20 are coupled to and receive direct current (DC) electric power from a DC electric power source 25 via DC power bus 24.

In the embodiment depicted in FIG. 2, each operating circuit 20 includes operatively coupled an LED driver circuit 26, a synchronization signal generator 28 and a power line communication (PLC) modem 30. The PLC modem transmits and receives a synchronizing data stream, which may be in the form of a high frequency wave imposed on the DC power bus 24, to/from the DC power bus 24. The PLC modems 30 provide a reference signal 32 to the synchronization signal generator 28.

The synchronization signal generator 28 generates a timing, synchronization signal to allow the LED driver circuit 26 to maintain a certain exciting frequency. Each light 14 and 16 includes a synchronization signal generator 28, and each synchronization signal generator 28 in each light 14 and 16 is able to communicate with each synchronization signal generator 28 other via the PLC modem 30 and the DC power bus 24 to synchronize timing. The synchronization signal generator 28 generates a trigger signal 34 to be delivered to the LED driver circuit 26, which according to the signal 34 drives the LED light source 18 of the associated light, e.g., lights 14 or 16, to illuminate in predetermined synchronization with the other of the lights 14 or 16, and/or in synchronization with one or more strobes or beacons (not depicted).

The PLC modem 30 may provide synchronization based upon a time signal, for example, a received GPS time beacon, may use a power-on synchronization process, may receive a signal or signals via the bus 24 or may otherwise be operable to generate and provide the signal 32 to the generator 28. The PLC modem 30 may be of suitable commercially available construction to provide the signal 32 over a DC power line. Furthermore, as depicted, the LED driver 26, signal generator 28 and PLC modem 30 are shown as discrete elements, but it will be appreciated, that these elements may be combined into an single module or device.

As described, the system 12 is operable to synchronize DC powered position lights, strobes and beacons, such as LED-based lights 14 and 16, on an aircraft without separate signal wire and connections. Thus, the system 12 allows implementation of DC powered, synchronized aircraft lighting with the elimination of weight associated with signal wires and connections.

Further depicted in FIG. 2, each module 22 may also include a fault detection module 36 operably coupled to the LED light source 18 and the LED driver 26. The fault detection module 36 detects a condition of both the LED light source 18 and LED driver 26. If any of LED light source 18 or the LED driver 26 is non-operational or demonstrates the possibility of an imminent change in operational state, a set of fault data 38 is generated and communicated to the PLC modem 30, from which the fault data 38 may be communicated to one or more aircraft systems, including without limitation Aircraft Communication and Report Systems (ACARS) or Digital Flight Data Acquisition Units (DFDAU) (not depicted in FIGS. 1 and 2).

Figure 3:
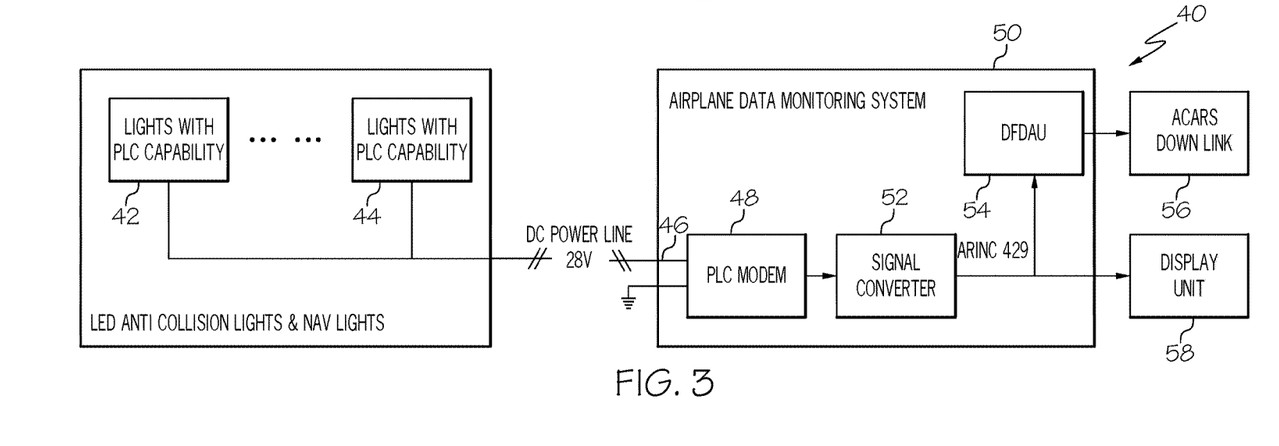
FIG. 3 is a block diagram of a synchronized LED-based light system in accordance with an alternate described exemplary embodiment.

Referring to FIG. 3, an aircraft synchronized light system 40 includes first light 42 and second light 44 While the system 40 is described as including two lights, 42 and 44, it will be understood that additional position lights, strobes, beacons and the like, that may require synchronized operation may be added to the system 40 without departing from the exemplary embodiment herein described.

The lights 42 and 44 are provided as modules capable of directly accepting a reference signal 46 from a PLC modem 48 via a direct current (DC) electric power bus 48. In this regard, the positions lights 42 and 44 may include LED light sources 18 and operation circuitry corresponding, for example, to the synchronization signal generator 28, the LED driver 26 and the fault detection module 36 of the embodiment depicted in FIG. 1.

As depicted in the embodiment shown in FIG. 3, the PLC modem 48 may be part of a data acquisition and monitoring system 50. The PLC modem 48 may receive a synchronization input 54 from a signal generator 52, from which it provides the reference signal 46 to the position lights 42 and 44. Furthermore, the position lights 42 and 44 are operable to detect and report operating condition to the PLC modem 46.

The PLC modem 46 in addition to being operably coupled to the signal generator 52 is also operably coupled to a Digital Flight Data Acquisition Unit (DFDAU) 54, which in turn is operably coupled to an Aircraft Communication and Report System (ACARS) 56. The ACARS 56 may link to a ground-based data management system. Furthermore, a light system 40 operating condition status indication of the system 40 may be provided to an in-cockpit display 58. While a DFDAU 54 and ACARS 56 are depicted, it will be appreciated that any suitable flight data acquisition system and aircraft communication system may be used within the scope of the herein described exemplary embodiments.

Figure 4:
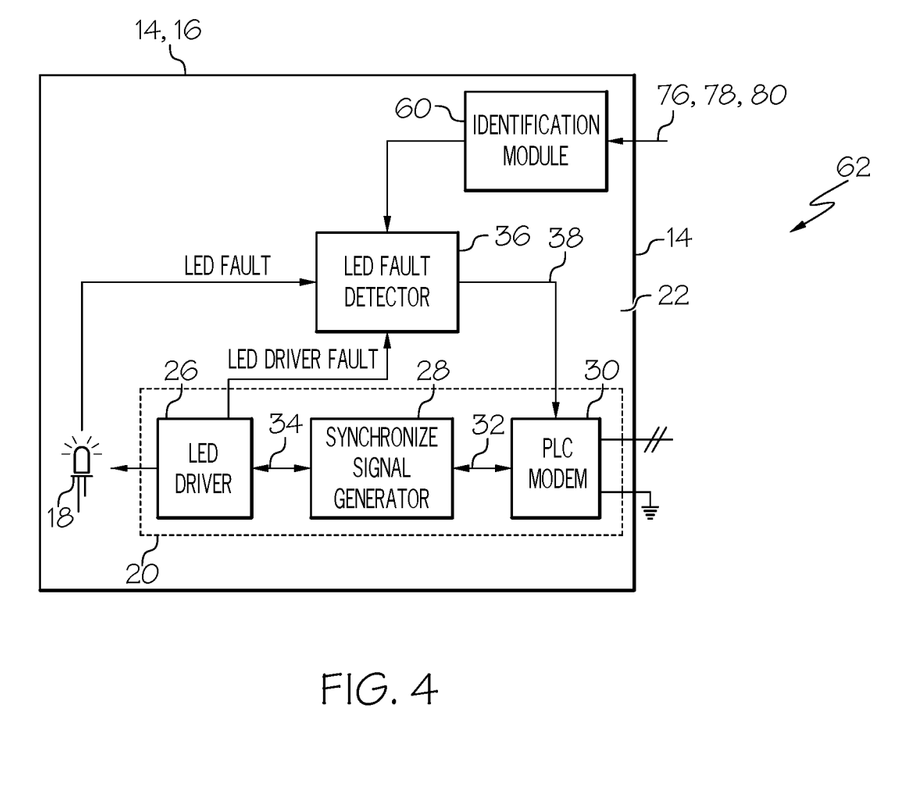
FIG. 4 is a block diagram of synchronized LED-based light system in accordance with an alternate described exemplary embodiment.

With reference to FIG. 4, a integrated module 62, similar to the module 22 depicted in FIG. 2, and wherein like elements have like reference numerals, further includes an identification module 60. The module 62 may be used in conjunction with or it may be integrated into a LED-based light assembly 68 as depicted in FIG. 5-7.

Figure 5:
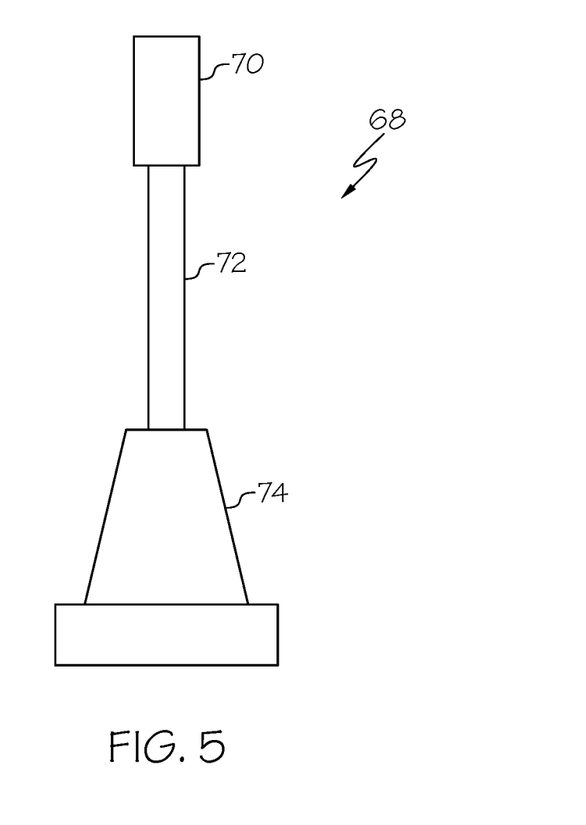
FIGS. 5-7 are graphic depictions of a LED-based light assembly in accordance with herein described exemplary embodiments.
Figure 6:
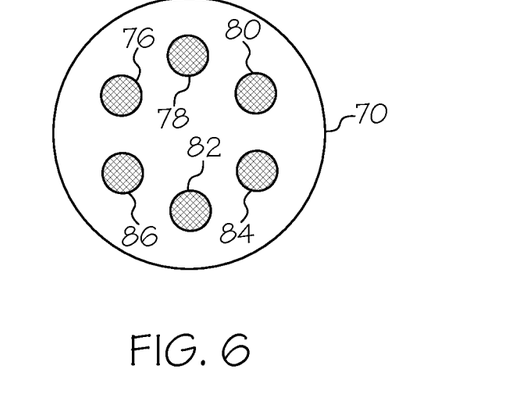
Figure 7:
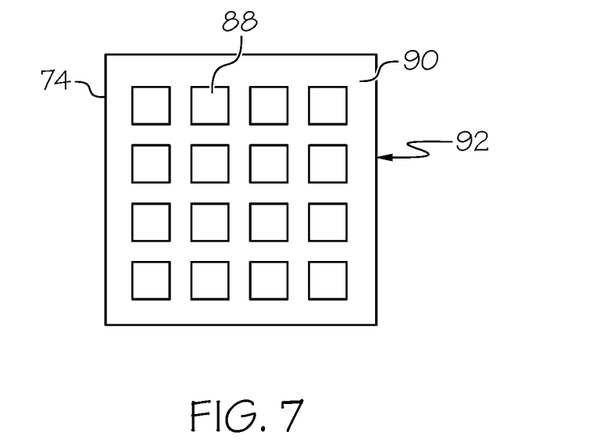

Turning to FIG. 5-7, the LED-based light assembly 68 include a 6 pin connector 70 coupled by a wire lead 72 to a LED housing 74. Pins 76, 78 and 80 of the connector 70 are identification pins, while pin 82 is a ground pin, pin 84 is a DC power pin and pin 86 may be a fault pin, or if fault detection is not employed, pin 86 may be unused.

Mounted to the housing 74 on a housing face 90 thereof are plurality of LED devices, one depicted as LED device 88, forming an LED array 92. Each LED device 88 may be capable of multi-color light emission, e.g., red, green and white, or each device 88 individually may be a dedicated color. In this regard, to provide a red light emission, if the LED devices 88 are multi-color, all LED devices 88 are caused to illuminate red. While, if a portion of the LED devices 88 are red LED devices, that portion of the devices are caused to illuminate red, while the remaining devices remain off.

Upon installation of the light assembly 68, one of the three identify pins, 76, 78 and 80, is coupled to the airframe, e.g., is grounded to the air frame. The remaining pins may be coupled to a lower power, DC bus, or may be left unconnected, as the case may be based upon the system configuration. Thus, the light assembly 68 may be installed at any position on the aircraft, and based upon the configuration of the identity pins 76, 78 and 80, provide the correct color of illumination in the correct predetermined sequence in accordance with the LED driver 26, synchronization circuit 30 and PLC modem 28. The Table depicted below provides an exemplary arrangement of the identity pins for providing each of the required position light or strobe light configuration, wherein in the table Identity Pin 1 corresponds to pin 76, Identity Pin 2 corresponds to pin 78 and Identity Pin 3 corresponds to pin 80.

TABLE 1

Identification Matrix

| Location | Identity Pin 1 | Identity Pin 2 | Identity Pin 3 |
|---|---|---|---|
| Left Navigation Light | 0 | 0 | 1 |
| Right Navigation Light | 0 | 1 | 0 |
| Top Strobe Light | 0 | 1 | 1 |
| Bottom Strobe Light | 1 | 0 | 0 |
| Left Strobe Light | 1 | 0 | 1 |
| Right Strobe Light | 1 | 1 | 0 |
| Tail Strobe Light | 1 | 1 | 1 |

In accordance with further exemplary embodiments, advantageously each light assembly secured to an aircraft, such as light assembly 68, can play either a lead or follow role. Furthermore, in accordance with the configuration of the identity pins, for example identify pins 76, 78 and 80, each light assembly is operable to provide a required colored light emission.

Figure 8:
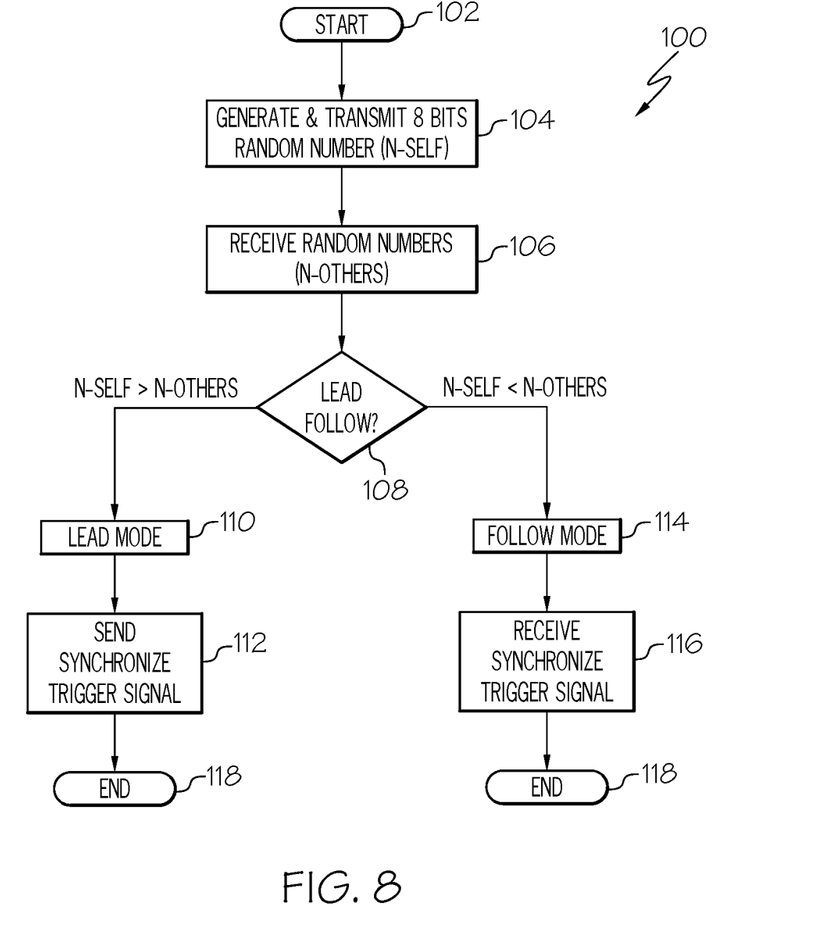
FIG. 8 is a flow chart depiction of a method of controlling LED-based light assemblies in accordance with herein described exemplary embodiments.

With reference to FIG. 8, a method 100 of controlling light assemblies to provide synchronized, color-coordinate light emissions begins at 100. Upon initial power up, the synchronize signal generator, e.g., generator 30, will generate a random number, 102. This random number may be 8 bits in length, which means that in an installation including 7 light assemblies 68, the likelihood of two light assemblies 68 generating the same random number is low. Each light assembly 68 transmits its random number to each other light assembly 68, and receives from each other light assembly the respective random number, 104. The light assembly 68 compares its (n-self) random number to the received random numbers (n-others), 106. If the n-self random number is greater than the n-other random numbers, the light assembly 68 enters leader mode, 108. That light assembly then sends the synchronization trigger signal to the other light assemblies 68, 110. If the n-self random number is less than any n-other random number, the light assembly 68 enters follower mode, 112. Those light assemblies await receipt of a synchronization trigger signal, 114. The process ends in either case at 116. The light emission of the light assemblies 68 is therefore self-syncrhonizing, and the color emission is provided based upon the configuration of the identity pins, e.g., pins 76, 78 and 80.

The foregoing detailed description is merely exemplary in nature and is not intended to limit the application and uses. Furthermore, there is no intention to be bound by any expressed or implied theory presented in the preceding technical field, background, brief summary or the detailed description. It should be understood that throughout the drawings, corresponding reference numerals indicate like or corresponding parts and features. As used herein, the term system or module may refer to any combination or collection of mechanical systems and components and/or other suitable components that provide the described functionality.

Embodiments may be described herein in terms of functional and/or logical block components and various processing steps. It should be appreciated that such block components may be realized by any number, combination or collection of mechanical components configured to perform the specified functions. Those skilled in the art will appreciate that the herein described embodiments may be practiced in conjunction with any number of mechanical components and systems, and that the systems described herein are merely exemplary.

For the sake of brevity, conventional components and techniques and other functional aspects of the components and systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof. Accordingly, details of the exemplary embodiments or other limitations described above should not be read into the claims absent a clear intention to the contrary.

What is claimed is:

1. An LED-based synchronized light system for an aircraft comprising:
    a first light emitting diode (LED) light source disposed on the aircraft;
    a second LED light source disposed on the aircraft;
    the first LED light source and the second LED light source operatively coupled to a direct current (DC) power source by a DC power bus;
    a power line communication (PLC) modem operatively coupled to the DC power bus, wherein the PLC modem is operable to impart a synchronization signal on the DC power bus such that the first LED light source and the second LED light source are caused to illuminate via power supplied from the DC power bus in a predetermined, synchronous manner with respect to each other; and a status monitor module that is operatively coupled to each of the first LED light source and the second LED light source and to associated LED operating circuits, the status monitor module being operable to provide a status signal which is communicated via the PLC modem to one of a cockpit indicator and a ground control device indicating the current operational status of each LED light source and the associated LED operating circuit.

2. The system of claim 1, wherein the PLC modem comprises a first PLC modem associated with the first LED light source and a second PLC modem associated with the second LED light source.

3. The system of claim 1, the first LED light source and the second LED light source each comprise a module including a PLC modem and a LED driver circuit.

4. The system of claim 1, wherein the first LED light source and the second LED light source each comprise an LED array operable to emit a light emission of a first color and a light emission of a second color, different from the first color.

5. The system of claim 1, wherein the first LED light source and the second LED light source are each being operable to enter a lead or follow synchronized operating mode.

6. The system of claim 1, wherein the status monitor module further comprises an operational status monitor operably coupled to the first LED light source and its associate LED operating circuit and an operational status monitor coupled the second LED light source and its associate LED operating circuit.

7. The system of claim 6, the operational status monitors each being operably coupled to the PLC modem.

8. The system of claim 6, the operational status monitors each being operably coupled to a flight data acquisition system and an aircraft communication system.

9. An aircraft including an LED-based synchronized light system, the aircraft comprising:
   a first light emitting diode (LED) light source disposed on an exterior of the aircraft;
   a second LED light source disposed on the exterior of the aircraft;
   the first LED light source and the second LED light source operatively coupled to a direct current (DC) power source provided on the aircraft by a DC power bus disposed within the aircraft;
   a power line communication (PLC) modem is operatively coupled to the DC power bus, wherein the PLC modem is operable to impart a synchronization signal on the DC power bus such that the first LED light source and the second LED light source are caused to illuminate via power supplied from the DC power bus in a predetermined, synchronous manner with respect to each other; and
   a status monitor module that is operatively coupled to each of the first LED light source and the second LED light source and to associated LED operating circuits, the status monitor module being operable to provide a status signal which is communicated via the PLC modem to one of a cockpit indicator and a ground control device indicating the current operational status of the LED light source and the associate LED operating circuit.

10. The aircraft of claim 9, wherein the first LED light source and the second LED light source comprise first and second portions of a beacon or anti-collision strobe.

11. The aircraft of claim 9, the first LED light source and the second LED light source each being operable to enter a lead or follow synchronized operating mode.

12. The aircraft of claim 9, the first LED light source and the second LED light source each comprising an LED array operable to emit a light emission of a first color and a light emission of a second color, different from the first color.

13. The aircraft of claim 9, the first LED light source and the second LED light source each comprising a module including an LED driver circuit and a PLC modem.

14. The aircraft of claim 9, further comprising a operational status monitor operably couple to the first LED light source and the second LED light source.

15. The aircraft of claim 9, the status monitor module being operably couple to the PLC modem.

16. The system of claim 15, the status monitor module being operably coupled to a flight data acquisition system and an aircraft communication system.

17. An aircraft light system operational status monitoring system, the aircraft light system including a first light emitting diode (LED) light source disposed on the aircraft and a second LED light source disposed on the aircraft, the first LED light source and the second LED light source are operatively coupled to a direct current (DC) electric power source by DC power bus, and a power line communications (PLC) modem operatively coupled to the DC power bus and being operable to impart a synchronization signal on the DC power bus, such that the first LED light source and the second LED light source are caused to illuminate via power supplied from the DC power source via the DC power bus in a predetermined, synchronous manner with respect to each other, the status monitoring system comprising:
   a status monitor module that is operatively coupled to each of the first LED light source and the second LED light source and to associated LED operating circuits, the status monitor module being operable to provide a status signal which is communicated via the PLC modem to one of a cockpit indicator and/or to a ground control device indicating the current operational status of the LED light source and the associate LED operating circuit.

18. The status monitoring system of claim 17, wherein the first LED light source and the second LED light source each comprise a module including a status monitor module.

19. The status monitoring system of claim 17, wherein the status monitor module is operably coupled to a flight data acquisition system and an aircraft communication system.

20. The status monitoring system of claim 17, the status signal being indicative of a current operational status or of an imminent change in the operational state of one of the first LED light source, the second LED light source or the associated LED operating circuit.

* * * * *